United States Patent
Hirayama (10) Patent No.: US 7,511,948 B2
(45) Date of Patent: Mar. 31, 2009

(54) SCREEN DISPLAY METHOD OF INFORMATION PROCESSING DEVICE, INFORMATION PROCESSING DEVICE AND ITS PROGRAM

(75) Inventor: Ryoji Hirayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 577 days.

(21) Appl. No.: 11/372,375

(22) Filed: Mar. 10, 2006

(65) Prior Publication Data

US 2006/0152898 A1 Jul. 13, 2006

Related U.S. Application Data

(63) Continuation of application No. PCT/JP03/11686, filed on Sep. 12, 2003.

(51) Int. Cl.
*H05K 7/00* (2006.01)
*G06F 1/16* (2006.01)

(52) U.S. Cl. ........................ 361/681; 345/905
(58) Field of Classification Search ................ 361/100, 361/681, 680; 345/905, 157
See application file for complete search history.

(56) References Cited

U.S. PATENT DOCUMENTS

| | | | |
|---|---|---|---|
| 6,822,851 B2 * | 11/2004 | Yukawa et al. | 361/679 |
| 6,847,519 B2 * | 1/2005 | Arbisi et al. | 361/680 |
| 6,865,075 B2 * | 3/2005 | Oakley | 361/683 |
| 7,071,917 B2 * | 7/2006 | Kori | 345/157 |
| 7,414,830 B2 * | 8/2008 | Weinstein et al. | 361/681 |
| 2006/0152897 A1 * | 7/2006 | Hirayama | 361/683 |

FOREIGN PATENT DOCUMENTS

| | | |
|---|---|---|
| JP | 62-128328 | 6/1987 |
| JP | 03-164917 | 7/1991 |
| JP | 04-218820 | 8/1992 |
| JP | 10-260751 | 9/1998 |
| JP | 11-353283 | 12/1999 |
| JP | 2000-284855 | 10/2000 |
| JP | 3074966 | 11/2000 |
| JP | 2001-125671 | 5/2001 |
| JP | 2001-325057 | 11/2001 |

OTHER PUBLICATIONS http://www.vaio.sony.co.jp/Products/Pdf/PCV-W120.pdf, "VAIO W" PCV-W120(L), W120(W), W110(W).

* cited by examiner

*Primary Examiner*—Hae Moon Hyeon
(74) *Attorney, Agent, or Firm*—Staas & Halsey LLP (57) ABSTRACT

An information processing device accommodates a first enclosure into a second enclosure including a display unit, to display an application program a display area of the display unit not hidden by the first enclosure. When the first enclosure is accommodated in the display unit, the screen of the display unit is divided, the screens of a plurality of applications are displayed, and the screen display on the exposed screen is switched over by scrolling. Thus, the screen display on the exposed screen can be switched over at high speed.

24 Claims, 11 Drawing Sheets

PRIOR ART

SCREEN DISPLAY METHOD OF INFORMATION PROCESSING DEVICE, INFORMATION PROCESSING DEVICE AND ITS PROGRAM

CROSS-REFERENCE TO RELATED APPLICATIONS

This application is a continuation of international application PCT/JP2003/011686, filed on Sep. 12, 2003.

BACKGROUND OF THE INVENTION

1. Field of the Invention

The present invention relates to a screen display method of a notebook and desktop information processing devices having structures of accommodating a keyboard, etc. by erecting the keyboard, etc. against a display unit, and the information processing device and a storage medium therefor, and more particularly, a screen display method of an information processing device, and the information processing device and a storage medium therefor, for controlling a screen display on a display unit when the keyboard is accommodated by erecting the keyboard against a display unit.

2. Description of the Related Art

In recent years, personal computers for individual use, which are structured of a variety of types, including notebook type, desktop type and portable type, are widely used. In such personal computers, there are required an Internet function and an AV (audio visual) function using DVD and TV, in addition to a data processing function. For this reason, a variety of personal computers are provided in the optimal forms depending on users and user environments.

For example, as a personal computer mainly used on a desk, there has been proposed a type capable of accommodating a keyboard by erecting the keyboard against a main body including an upright display (for example, Japanese Unexamined Patent Publication No. Hei-3-164917, Japanese Unexamined Patent Publication No. 2000-284855, and Japanese Unexamined Patent Publication No. Hei-4-218820).

Figure 10:
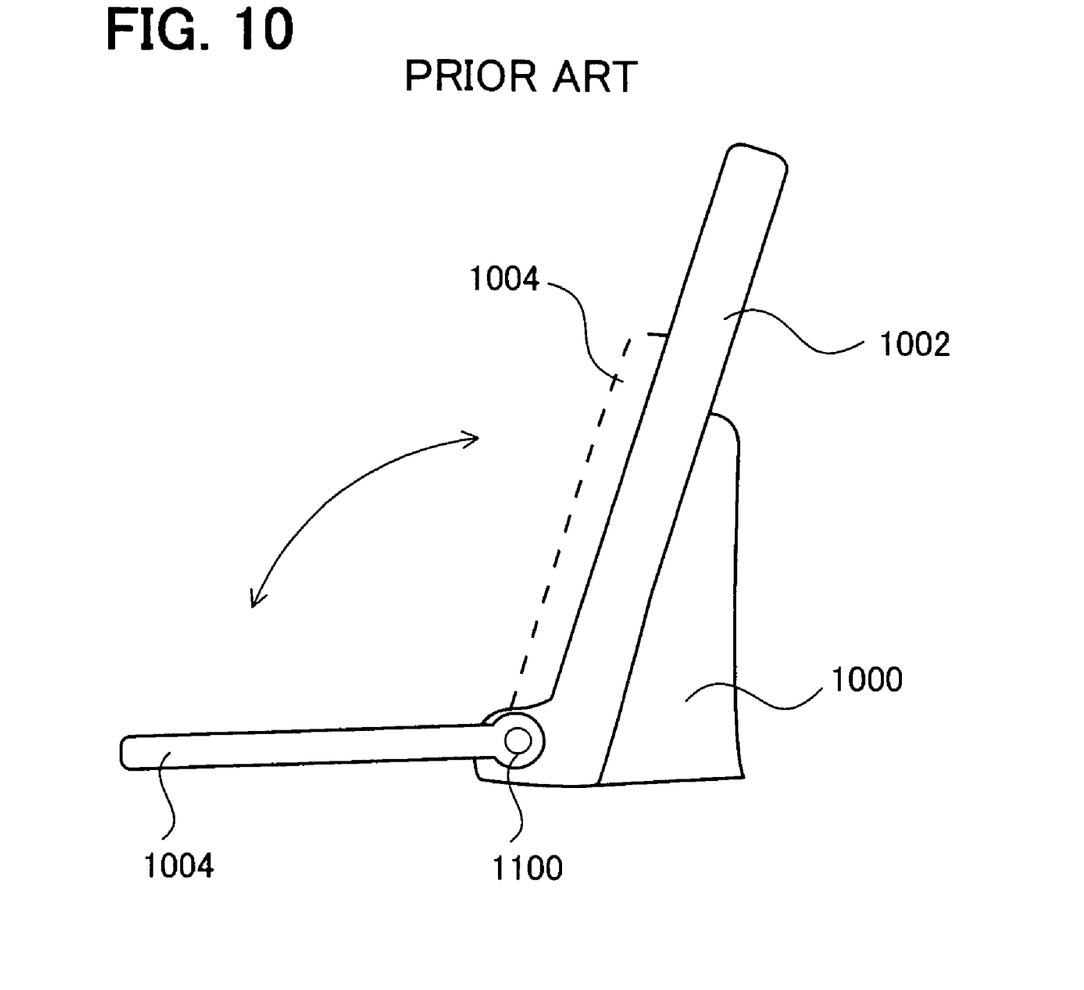
FIG. 10 shows a configuration diagram of the conventional art.
Figure 11:
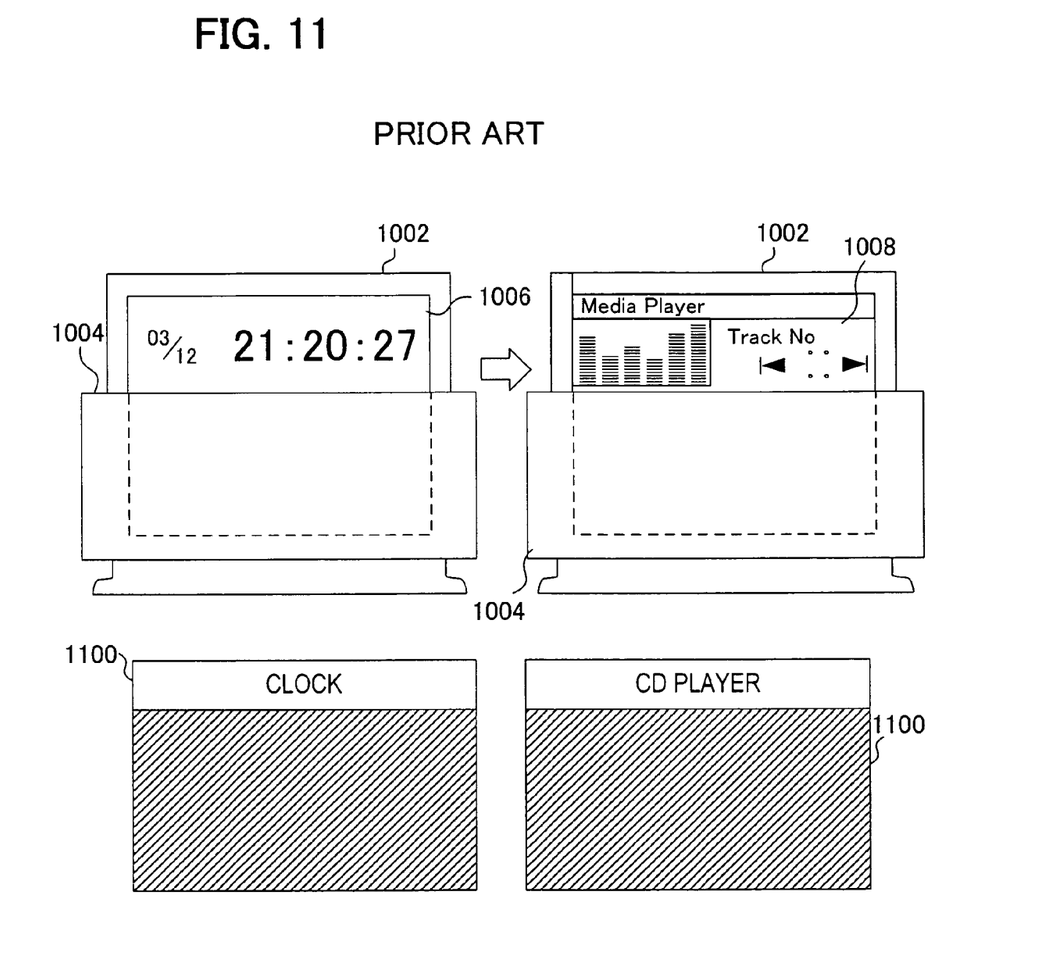
FIG. 11 shows an explanation diagram of the screen display operation according to the conventional art.

Among such personal computers, there is a type that a portion of a display screen of the display is exposed when the keyboard is accommodated. FIG. 10 shows a configuration diagram of a conventional personal computer, and FIG. 11 shows an explanation diagram of a screen display thereof. A display 1002 is provided to erect on a base portion 1000 having a power supply unit and main circuits. On the base portion 1000, a keyboard 1004 is disposed by means of a hinge 1100.

The keyboard 1004 is rotated around hinge 1100 from a horizontal state shown in the figure, and as shown by the dotted line, accommodated by being erected against the upright display 1002. At this time, as shown in FIGS. 10, 11, the lower screen portion of the display 1002 is covered with the keyboard 1004, while the upper portion thereof is exposed.

Conventionally, when the keyboard 1004 is accommodated without terminating the OS (Operating System) of the personal computer, as shown in FIG. 11, an application (clock, CD player, or the like) 1006 of the exposed screen size is initiated, so as to display on the exposed screen 1006 of display 1002. Thus, by operating the application, which does not use the keyboard, under an operation condition of the OS, the application has been provided for use by the user.

In such the form of use with the mounted keyboard 1004, as shown in FIG. 11, it is possible to switch over to a CD player screen 1008 and a DVD screen by the instruction from a mouse or a key of dedicated use, when a clock display 1006 is being made on the exposed screen.

In the conventional method, the application only writes an image(s) for the exposed screen of display 1002 into a VRAM (video RAM) 1100, which is a screen memory for display 1002, and accordingly, when a screen switchover is instructed from a mouse, etc., the switchover screen is written into VRAM 1100. Therefore, it takes a long time to switch over the screen, which is particularly noticeable in the display of 15 inches or more, causing a lack of convenience for the user.

SUMMARY OF THE INVENTION

Accordingly, it is an object of the present invention to provide a screen display method of an information processing device for reducing a screen switchover time when performing screen display on an exposed screen of a display in a state of mounting a first enclosure such as a keyboard, and the information processing device and a computer readable storage medium therefor.

It is another object of the present invention to provide a screen display method of an information processing device when performing screen display on an exposed screen of a display in a state of mounting a keyboard, for reducing a screen switchover time and efficiently utilizing the exposed screen, and the information processing device and a computer readable storage medium therefor.

It is still another object of the present invention to provide a screen display method of an information processing device when performing screen display on an exposed screen of a display in a state of mounting a keyboard, for reducing a screen switchover time and improving the convenience for the user, and the information processing device and a computer readable storage medium therefor.

In order to achieve the aforementioned objects, according to the present invention, in a screen display method of an information processing device constituted of a first enclosure and a second enclosure including a display device, the screen display method includes: a step for detecting that the first enclosure has been positioned in the second enclosure so as to hide a portion of the screen of the display device; in response to the detection, a step of dividing the display area of the display device into screens, and displaying each image of a plurality of application programs on each divided screen; and in response to a screen switchover instruction, a step of scroll displaying the application program image of the divided screen hidden by the first enclosure, in a screen area of the display device not hidden by the first enclosure.

Further, an information processing device according to the present invention includes a first enclosure; a second enclosure including a display unit and an information processor unit; and a hinge for accommodating the first enclosure in the second enclosure so that the first enclosure hides a portion of the display screen of the display unit. On detection of the first enclosure having been accommodated, the information processor unit divides the display area of the display unit into screens, displays each image of a plurality of application programs on each divided screen, and further, in response to a screen switchover instruction, scroll displays the application program image of the divided screen hidden by the first enclosure, in a screen area of the display unit not hidden by the first enclosure.

Still further, in a computer readable storage medium stored a program according to the present invention, the screen display program for an information processing device including a first enclosure and a second enclosure having a display unit and an information processor unit causes the information processor unit to execute: a step of detecting a step for detecting that the first enclosure has been positioned in the second enclosure so as to hide a portion of the screen of the display unit; in response to the detection, a step of dividing the display area of the display unit into screens, and displaying each image of a plurality of application programs on each divided screen; and in response to a screen switchover instruction, a step of scroll displaying the application program image of the divided screen hidden by the first enclosure, in a screen area of the display unit not hidden by the first enclosure.

According to the present invention, when the first enclosure is accommodated in the display unit, because the screen is divided, the screens of a plurality of applications are displayed, and the screen display on the exposed screen is switched by scrolling, the screen display on the exposed screen can be switched at high speed.

Further, according to the present invention, preferably, the step of displaying on each divided screen includes a step for dividing a storage area of a video memory for storing the image of the display area of the display unit into image storage areas for the plurality of application programs, and storing the application program image corresponding to each divided storage area. Also, the step of scroll displaying includes a step of modifying a screen display start address of the video memory, in response to the screen switchover instruction.

According to the above aspect of the present invention, because only modification of the display start address in the VRAM is necessary, the screen display on the exposed screen can be switched at higher speed, and with simple processing.

Further, according to the present invention, preferably, the step of displaying on each divided screen includes a step for displaying an image including a scroll bar, at least in the image displayed on a screen area of the display unit not hidden by the first enclosure. With this, even if the first enclosure is accommodated, the screen switchover can easily be instructed.

Further, according to the present invention, preferably, the image switchover step includes a step of operating a pointer at the scroll bar by means of a mouse. With this, the screen switchover can easily be instructed in a state that the first enclosure is accommodated.

Further, according to the present invention, preferably, the step of displaying on each divided screen includes a step of dividing the display area of the display unit into a plurality of screens, on a basis that the area not hidden by the first enclosure is treated as one division unit. With this, the screen switchover can be made on a basis of the exposed screen of the display.

Further, according to the present invention, preferably, the detection step includes a step of detecting from an output of detection means for detecting that the first enclosure being attached via a hinge has been accommodated in the second enclosure so as to hide the display unit in the second enclosure. With this, it becomes possible to detect that the first enclosure is accommodated and that a portion of the display is hidden.

Further, according to the present invention, preferably, the detection step includes a step of detecting from an output of first detection means for detecting that the first enclosure has been attached to the hinge, and an output of second detection means for detecting that the hinge has been rotated and moved to the display unit in the second enclosure. With this, even a structure such that the first enclosure can be separated from the display unit is adopted, it is possible to detect that the first enclosure is accommodated and that a portion of the display is hidden.

Further, according to the present invention, preferably, the first enclosure is constituted of a keyboard, by which the convenience of the personal computer can be improved.

DESCRIPTION OF THE PREFERRED EMBODIMENTS

The preferred embodiments of the present invention are described hereinafter, in the order of information processing device, screen display control processing, and other embodiments.

Information Processing Device

Figure 1:
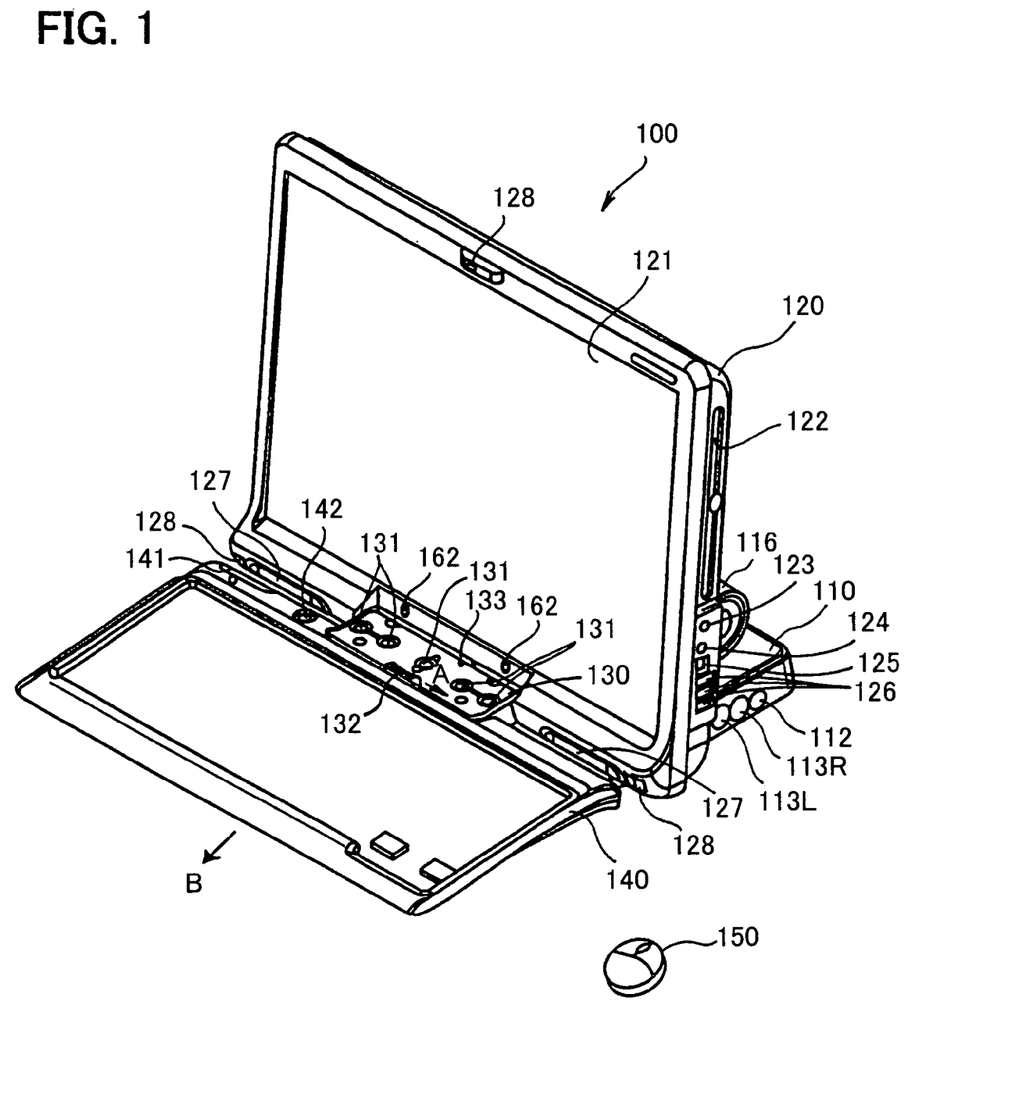
FIG. 1 shows an outer view of an information processing device of keyboard accommodation type, according to one embodiment of the present invention.
Figure 2:
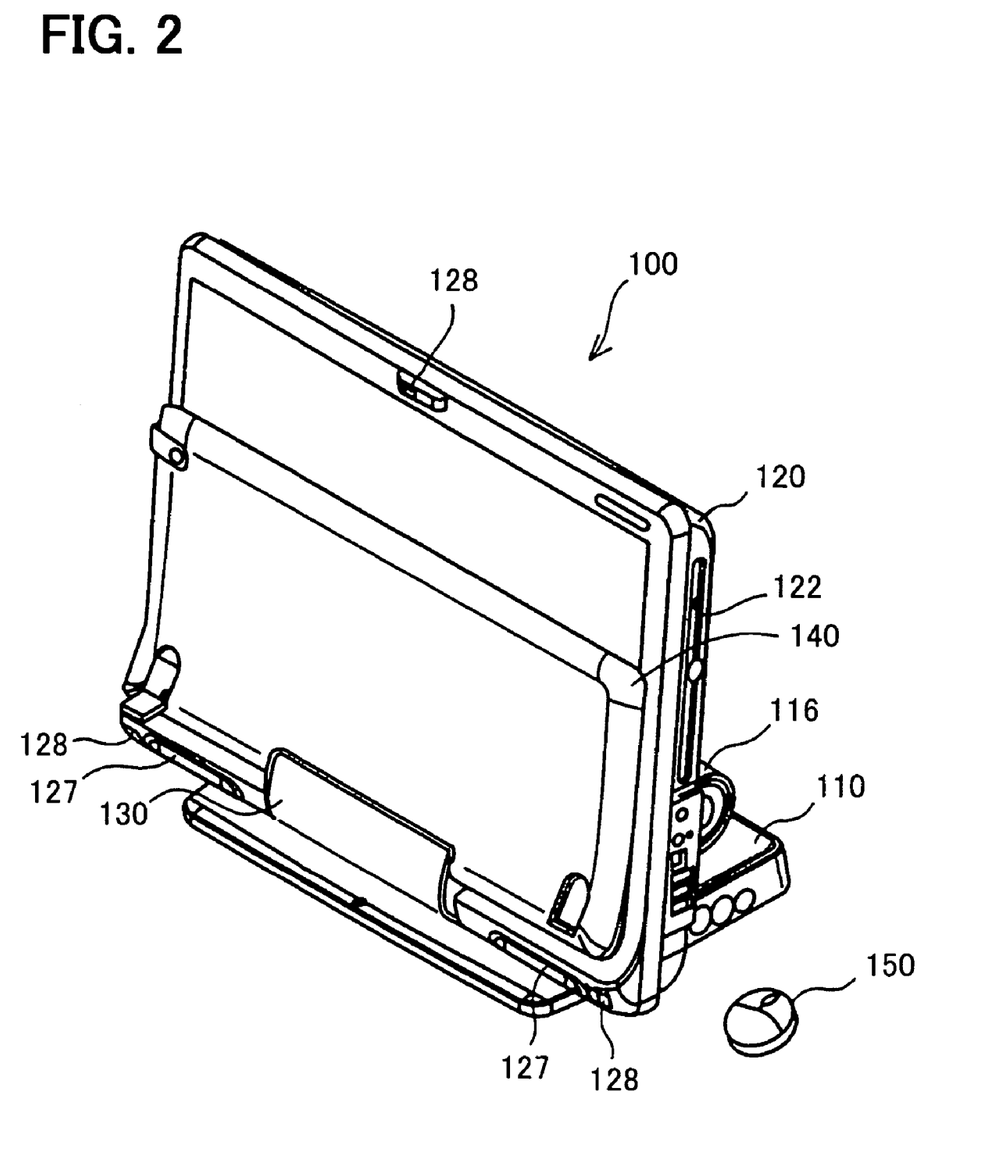
FIG. 2 shows an explanation diagram of the unit shown in FIG. 1, in a state of the keyboard being accommodated.
Figure 3:
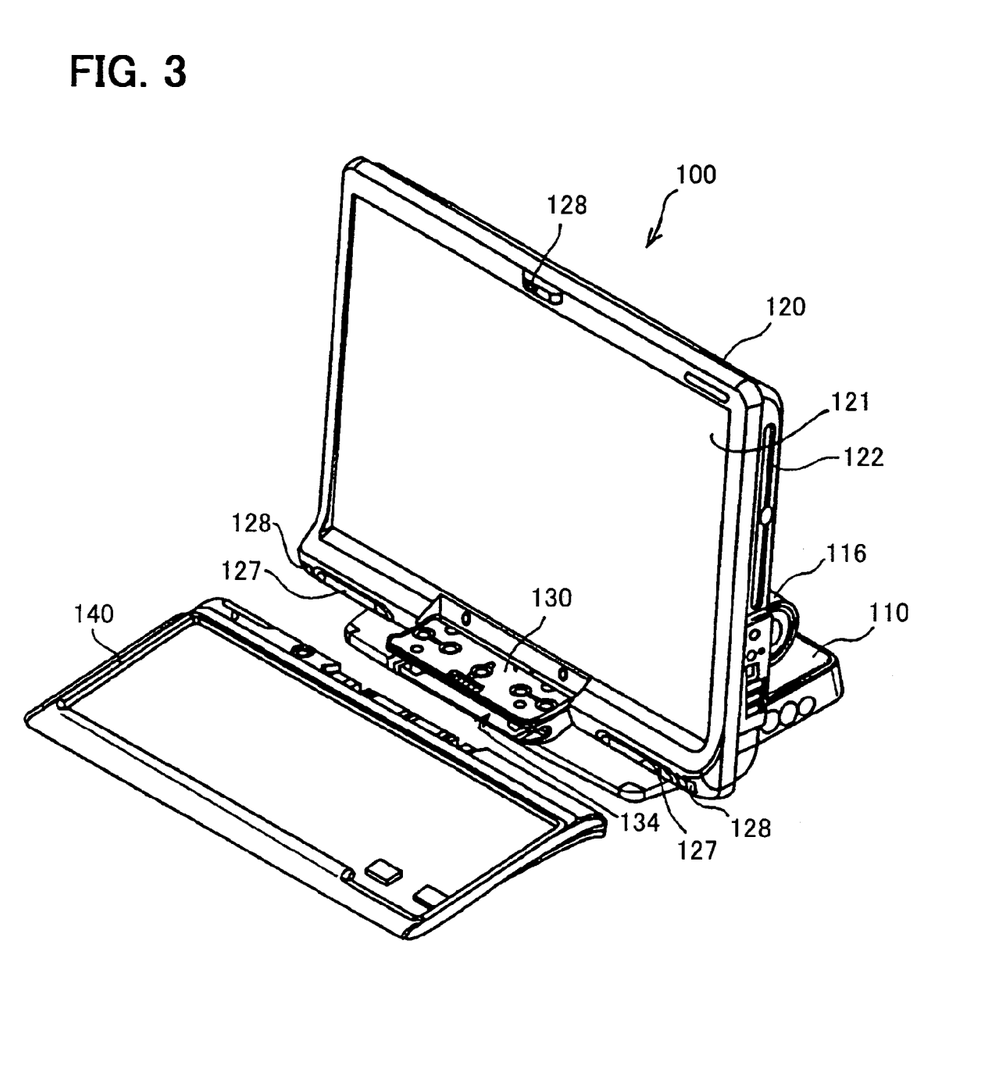
FIG. 3 shows an explanation diagram of the unit shown in FIG. 1, in a state of the keyboard being detached.
Figure 4:
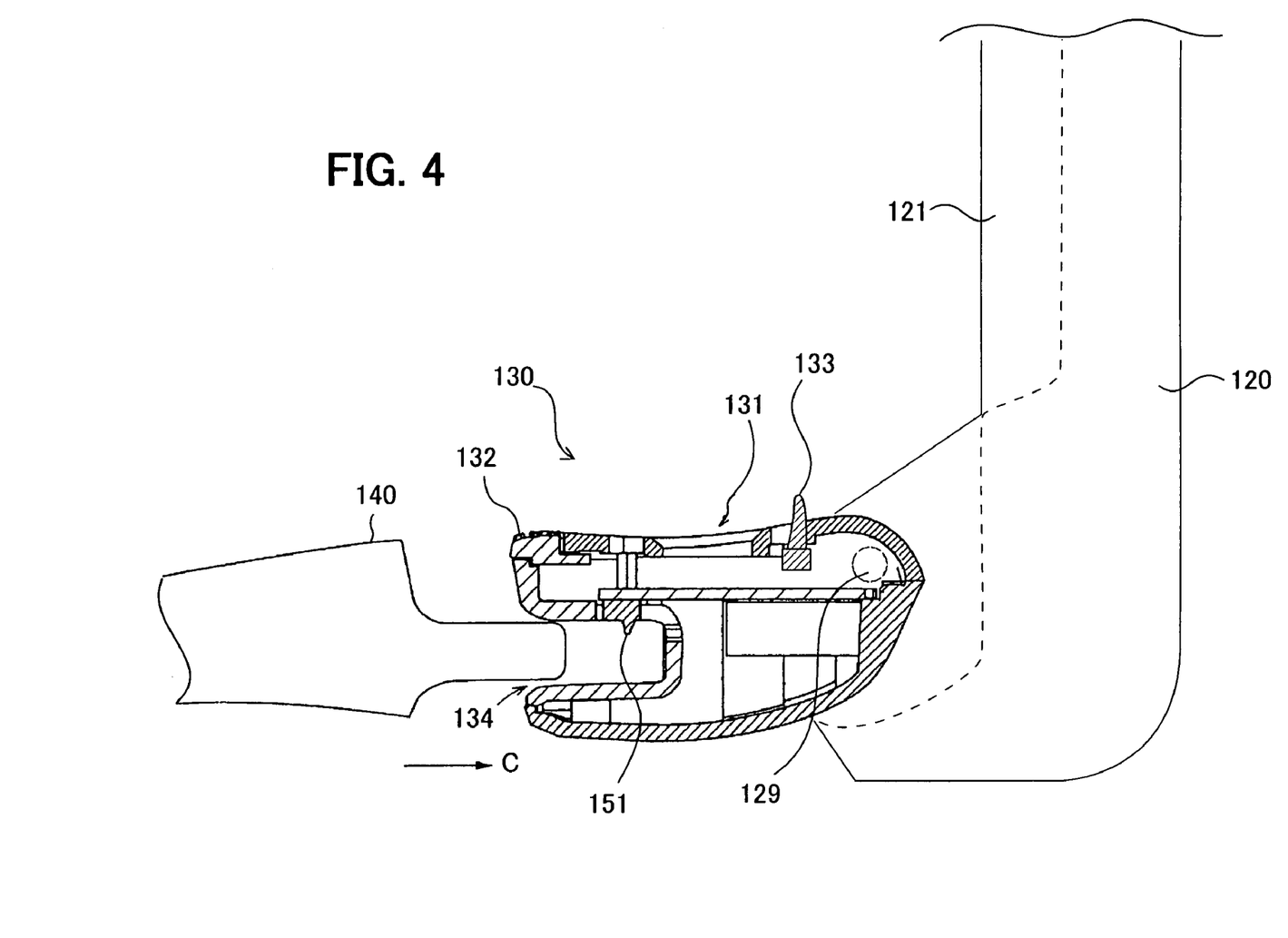
FIG. 4 shows a cross sectional view of the hinge unit shown in FIG. 1.

FIG. 1 shows an outer view of an information processing device of keyboard accommodation type, according to one embodiment of the present invention; FIG. 2 shows an explanation diagram of the unit shown in FIG. 1, at the time of the keyboard being accommodated; FIG. 3 shows an explanation diagram of the unit shown in FIG. 1, at the time of the keyboard being detached; and FIG. 4 shows a cross sectional view of the hinge shown in FIG. 1.

FIG. 1 exemplifies an integral personal computer 100 as an information processing device of keyboard accommodation type. As shown in FIG. 1, the personal computer 100 includes a base 110, an erection portion 120, a hinge unit 130, a keyboard 140 and a mouse 150.

The base 110 is a portion forming a foundation placed on a horizontal surface of a desk, etc. On the base 110, a non-illustrated battery pack is mounted, as well as a non-illustrated AC adaptor connection terminal. Further, on the base 110, there are provided an antenna terminal 112 for connecting to a television antenna, audio input terminals 113R and 113L, an S-video input terminal and a video input terminal (not shown). A woofer 116 is provided on the base 110.

Next, the erection portion 120 is supported in a state of erecting on the base 110, and provided with a liquid crystal display screen 121 on the front face thereof. This erection portion 120 is axially supported so as to rotating against the base 110 to a certain angle, and thereby regulating the elevation angle of the liquid crystal display screen 121.

Also, on the above erection portion 120, on the back face side of the display screen 121, there is mounted a main arithmetic operation function portion of a computer, including a CPU and a hard disk, as will be described in FIG. 5. Further, on the side face of the erection portion 120, there are provided a CD/DVD loading inlet (slot) 122 for loading a CD (Compact Disk) and a DVD (Digital Versatile Disk), a headphone output terminal 123 for inserting a headphone jack, a microphone input terminal 124 for inserting a microphone jack, a connector terminal 125 for inserting a communication cable connector conforming to the communication standard of IEEE 1394, three connector terminals 126 for inserting communication cable connectors conforming to the communication standard of USB.

Further, on the lower portion of the front face of the erection portion 120, two speakers 127 at right and left, and a total of three infrared receivers 128, one each on the right or left lower portion and one on the upper portion, are provided. The above infrared receivers 128 are provided for receiving infrared for communication transmitted from the keyboard 140 and the mouse 150 described later.

Also, on the hinge unit 130, five one-touch buttons 131 are provided. The hinge unit 130 includes a built-in circuit board having a circuit for detecting the operation of one-touch buttons 131, and transmitting the detection result to the erection portion 120.

To each of the above five one-touch buttons 131, it is possible to assign each function correspondingly, for example, startup of a program for the Internet when a certain one-touch button is depressed.

Also, the above hinge unit 130 is provided for detachably supporting the keyboard 140. On the hinge unit 130, a removal operation button 132 is provided for detaching from the hinge unit 130 the keyboard 140 mounted on the hinge unit 130.

FIG. 3 shows a perspective view which illustrates a state of the keyboard 140 being detached from the hinge unit 130. As shown in FIG. 3, the hinge unit 130 includes a slit-shaped keyboard grip 134 extending right and left, for gripping the keyboard 140.

By inserting the keyboard 140 into the grip 134 of the hinge unit 130, while being left in a position shown in FIG. 3, the keyboard 140 is mounted on the hinge unit 130, as shown in FIG. 1. Also, by operating the removal operation button 132 to the direction shown by an arrow A illustrated in FIG. 1, the engagement between the keyboard 140 and the hinge unit 130 is detached. Then, by drawing the keyboard 140 to the direction shown by an arrow B illustrated in FIG. 1, the keyboard 140 is detached from the hinge unit 130, as shown in FIG. 3.

The above hinge unit 130 is axially supported by a support axis 129 (refer to FIG. 4) disposed on the erection portion 120, and rotates around the above support axis 129. With this, the keyboard 140 can be rotated between a close state in which the keyboard 140 covers the liquid display screen 121, as shown in FIG. 2, and an open state in which the keyboard 140 is opened from the erection portion 120 so as to expose the entire face of the liquid crystal display screen 121, as shown in FIG. 1.

Further, as shown in FIG. 4, the hinge unit 130 is provided with a hinge unit open/close detection switch 133 for detecting whether the hinge unit 130 lies in the open state shown in FIG. 1 or the close state shown in FIG. 2, and a keyboard detection switch 151 for detecting whether the keyboard 140 is mounted on the hinge unit 130 or the keyboard 140 is detached from the hinge unit 130 as shown in FIG. 3.

By means of the circuit on a circuit board incorporated in the hinge unit 130, in addition to the detection of depression of five one-touch keys 131, the detection of ON/OFF of both the hinge unit open/close detection switch 133 and the keyboard detection switch 151 is performed also.

In addition, as shown in FIG. 1, a receiver 162 formed of an elastic body such as rubber is disposed on the erection portion 120. The above receiver 162 flexibly receives the abutment of the hinge unit 130 when being folded as shown in FIG. 2.

Also, on the keyboard 140, a multiplicity of keys (not shown in the figure) for accepting key operation are arrayed, and further, there are provided an infrared transmitter 141 for transmitting key operation information, and a 'Suspend' button 142 for starting up the integral personal computer 100 from a suspended state. The key operation information transmitted from the infrared transmitter 141 of the keyboard 140 is received in the infrared receiver 128 disposed on the erection portion 120.

On the mouse 150 also, infrared transmitter (not shown) for transmitting operation information of the mouse 150 is provided, and the mouse operation information transmitted from the above infrared transmitter is received in infrared receiver 128 disposed on the erection portion 120.

Here, as to the size of the keyboard 140, in regard to the size in the right and left direction is approximately the same as the erection portion 120, while the size in regard to the depth direction shown in FIG. 1 (that is, the upward and downward direction in the close state shown in FIG. 2) is smaller than the erection portion 120. Therefore, in the close state shown in FIG. 2, the keyboard 140 covers only a portion of the display screen 121 of the erection portion 120. Even in the close state shown in FIG. 2, an approximately one-third of the upper side area of the display screen 121 is left exposed.

Using such the upright personal computer 100, it is possible to utilize the space on the desk widely during the state of the keyboard being accommodated, as shown in FIG. 2. Also, when using the keyboard 140, by opening the keyboard 140, in addition to the use in the state shown in FIG. 1, it is also possible to operate by detaching the keyboard 140, as shown in FIG. 2. In the use pattern shown in FIG. 3, it is possible to separate the keyboard 140 from the main units 120, 110 including the display. The keyboard 140 can be placed and operated without being restricted by the location of the main units.

Also, as shown by the close state shown in FIG. 2, because the keyboard 140 covers only a portion of the display screen 121 on the erection portion 120, and the approximately one-third of the upper side area of the display screen 121 is left exposed, a variety of screens can be displayed on the above exposed screen.

Screen Display Control Processing

Next, screen display control processing of the aforementioned personal computer will be described. FIG. 5 shows a circuit block diagram of the integral personal computer 100 according to the embodiment shown in FIG. 1 through 3.

Figure 5:
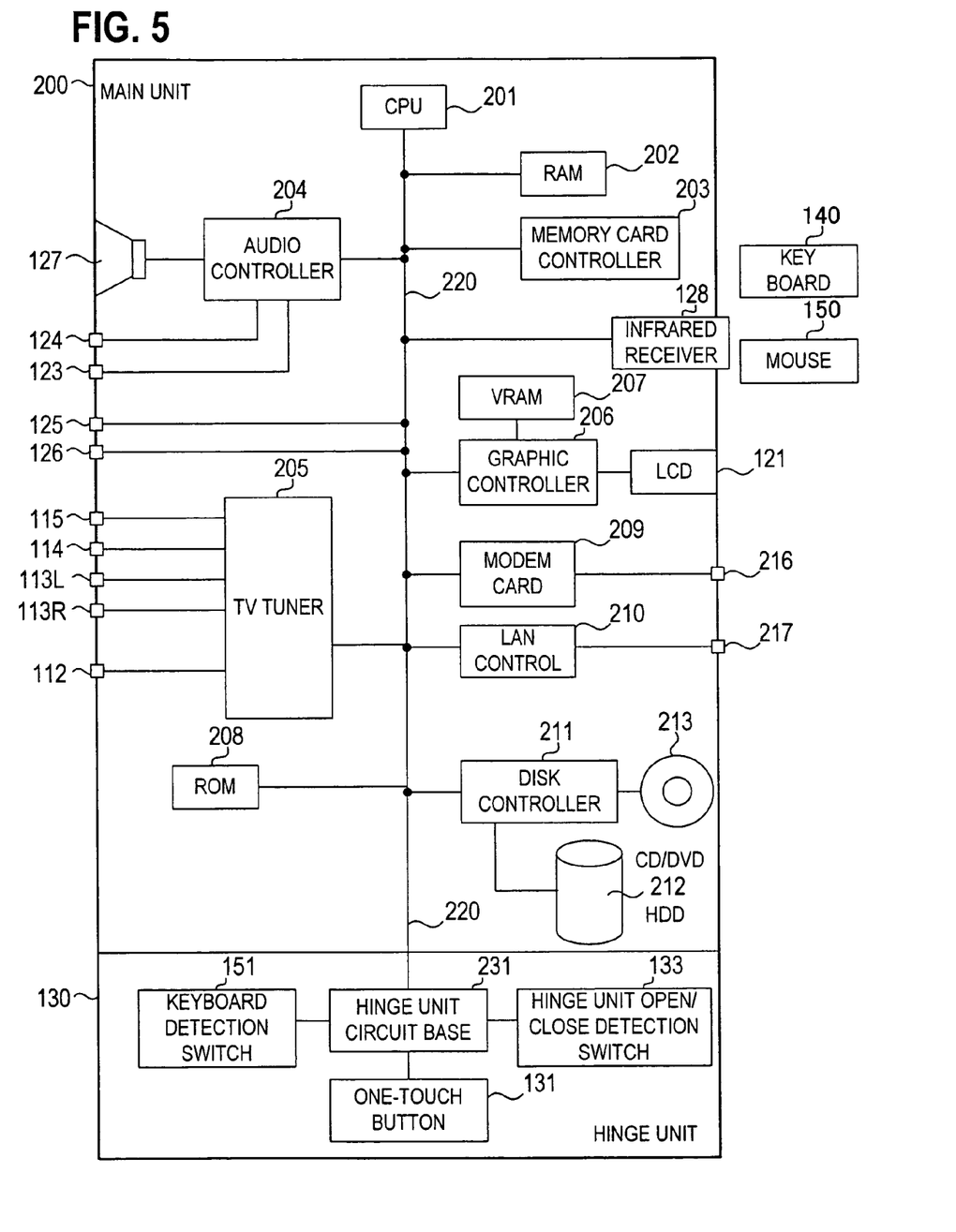
FIG. 5 shows an internal block diagram of the unit shown in FIG. 1.

Main unit 200 shown in FIG. 5 is a portion in which base 110 and erection portion 120 shown in FIG. 1 are combined. In the above main unit 200, there are provided CPU 201, RAM (Random Access Memory) 202, a memory card controller 203, an audio controller 204, a television tuner 205, a graphic controller 206, VRAM (video RAM) 207, the liquid crystal display 121, ROM (Read Only Memory) 208, a modem card 209, a LAN controller 210, and a disk controller 211.

Further, the main unit 200 is provided with the infrared receiver 128 as shown in FIG. 1 also, the connector terminal 125 conforming to the IEEE 1394 standard, and the connector terminals 126 conforming to the USB standard, which are mutually connected via a bus 220.

CPU 201 is an element for performing a variety of types of arithmetic operation processing by executing programs. RAM 202 is a memory for expanding programs for the execution in CPU 201, and for working use during the program execution by CPU 201.

The memory card controller 203 is a controller for accessing a non-illustrated memory card. The audio controller 204 is connected to the headphone output terminal 123, the microphone input terminal 124 and the speaker 127, so as to convert an audio signal being input from the microphone input terminal 124 into a digital signal and to take internally, and to convert a digital signal transmitted via bus 220 into an analog signal, to transmit to the speaker 127 and the headphone output terminal 123.

Also, as described earlier, the infrared receiver 128 is provided for receiving operation information of the keyboard 140 and the mouse 150. The television tuner 205 is connected to the antenna input terminal 112, the audio input terminals 113R, 113L, the S-video input terminal 114 and the video input terminal 115, which is an element for playing the role of recording and playback of television broadcast and video.

Further, the non-illustrated memory card is a portable memory card which can arbitrarily inserted in the personal computer of integrated structure, such as, for example, Memory Stick and SD memory card. The memory card is accessed by the memory card controller 203.

The liquid crystal display (LCD) 121 provides a liquid crystal display screen shown in FIG. 1, for displaying a variety of images on the liquid crystal display screen 121 thereof, according to an instruction of CPU 201. ROM 208 is a memory element for storing fixed data and programs. The modem card 209 is an element for performing a kind of communication, and is connected to the communication connector 216. Also, the LAN controller 210 is an element for performing a kind of communication, and is connected to the communication connector 217.

Further, the disk controller 211 accesses a hard disk 212 incorporated in the main unit 200, and a CD/DVD 213 loaded from the CD/DVD loading inlet 122 shown in FIG. 1.

VRAM 207 is a screen memory of the liquid crystal display 121, and stores image data for at least one page of the screen, desirably a few pages, in the form of bitmap. The graphic controller 206 expands an image to bitmap image onto a screen area of VRAM 207 specified by CPU 201, reads out the bit image from a screen start address of VRAM 207, and controls display of the liquid crystal display 121.

Also, the hinge unit 130 shown in the lower portion of FIG. 5 is provided with a hinge unit circuit board 231 connected to the bus 220, in addition to the aforementioned one-touch buttons 131, the hinge unit open/close detection switch 133 and the keyboard detection switch 151. The above hinge unit circuit board 231 plays the role of detecting the operation of the one-touch buttons 131, and ON/OFF of the hinge unit open/close switch 133 and the keyboard detection switch 151, and transmitting it to CPU 201.

Figure 6:
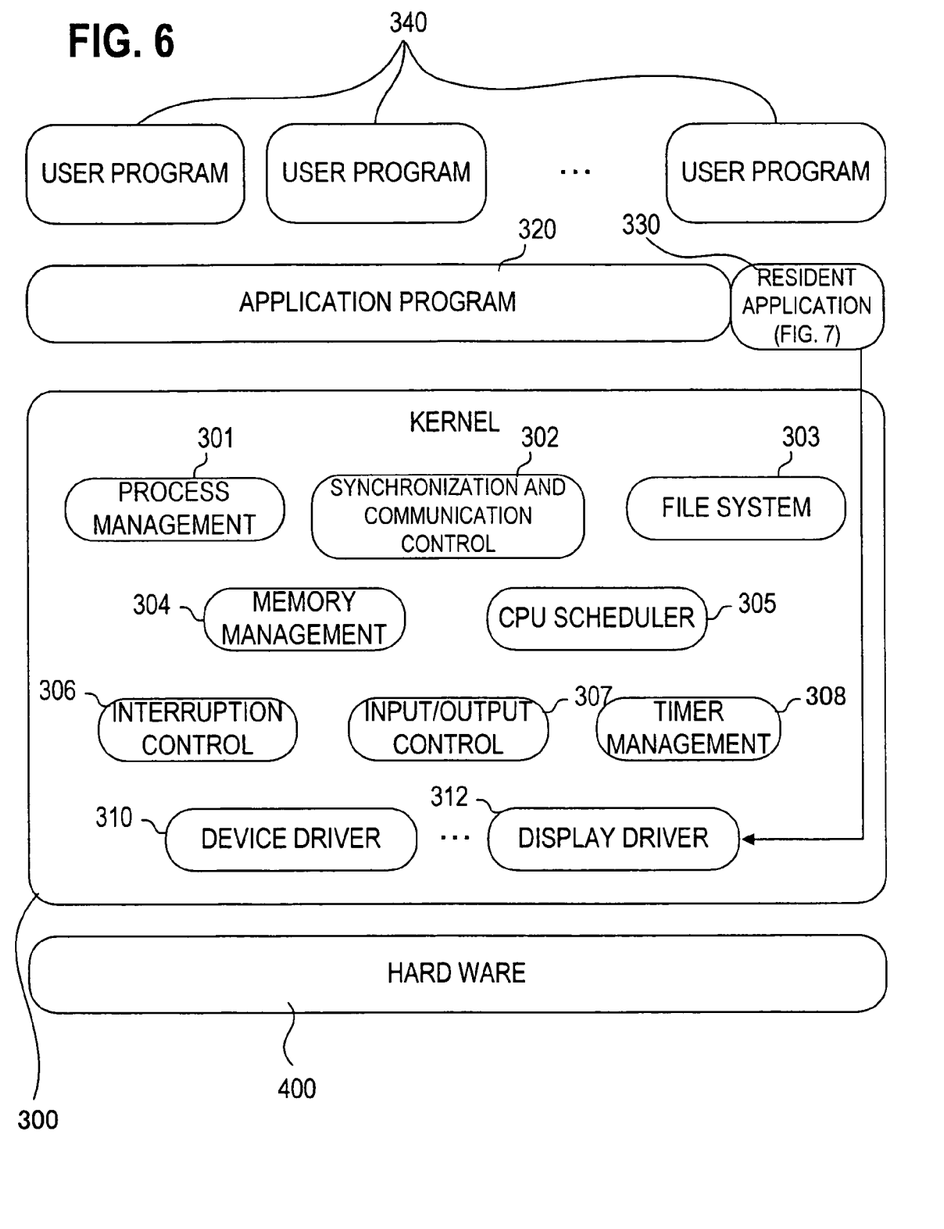
FIG. 6 shows a configuration diagram of the operating system of the unit shown in FIG. 1.
Figure 7:
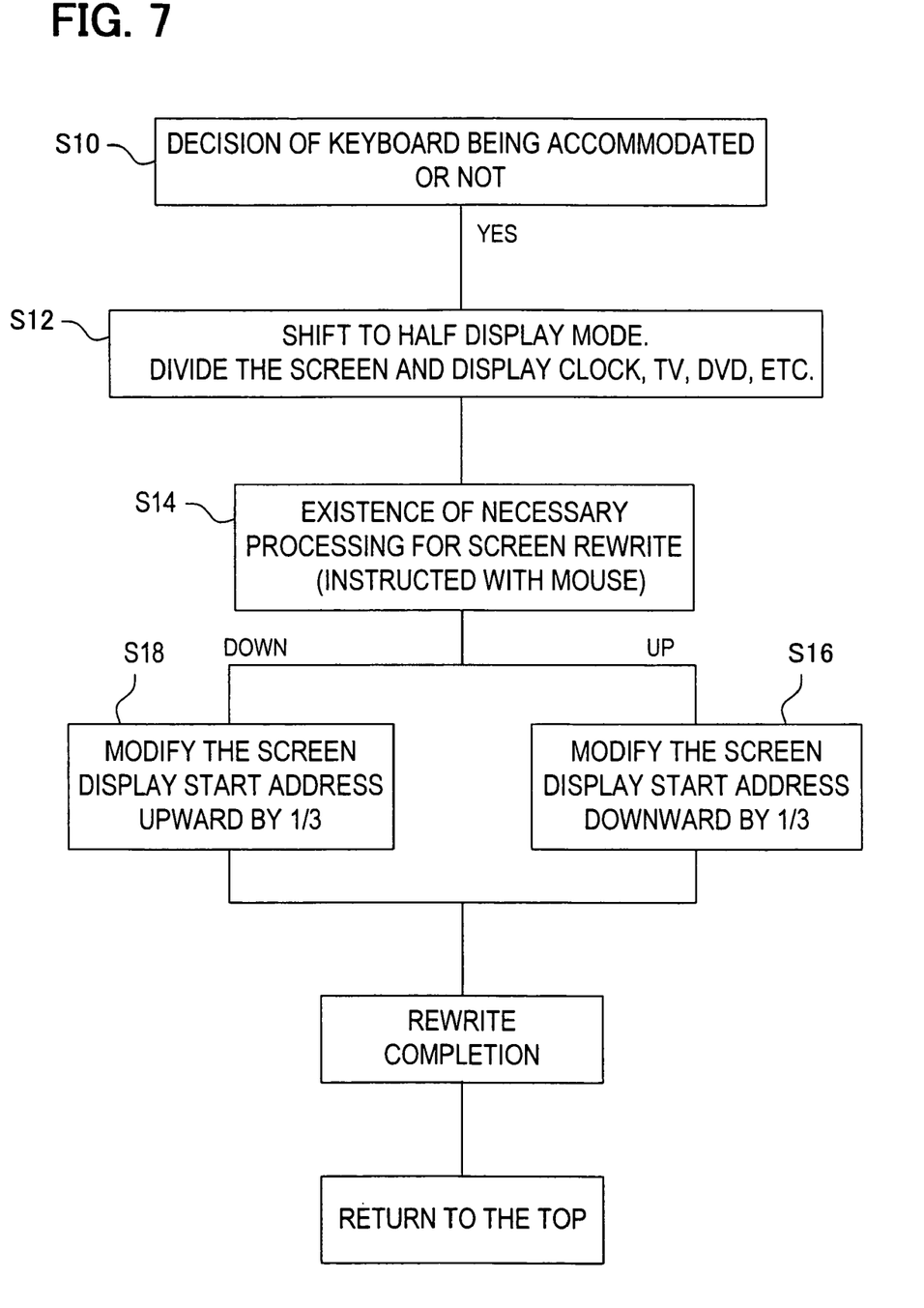
FIG. 7 shows a process flowchart of the resident application shown in FIG. 6.
Figure 8:
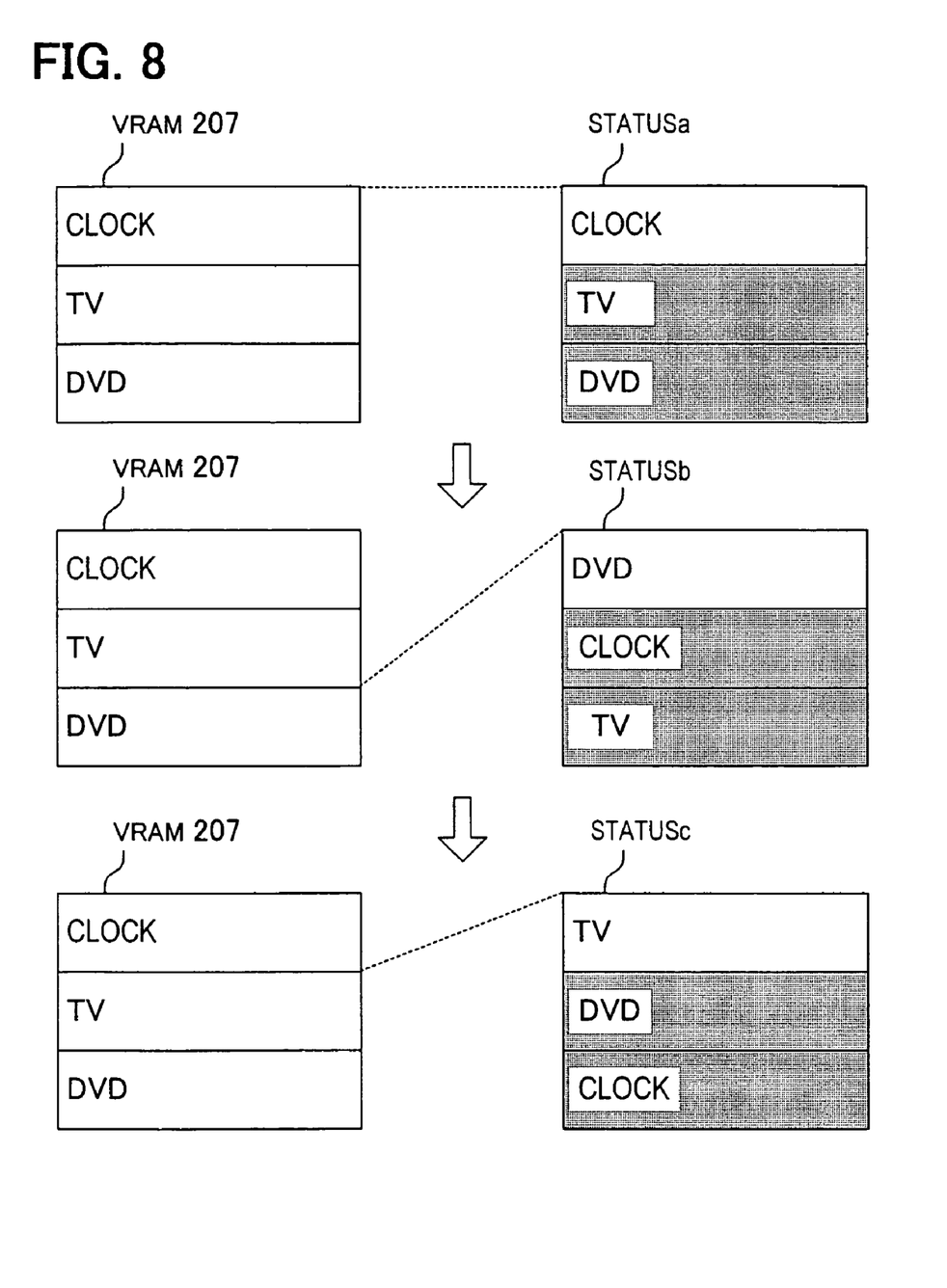
FIG. 8 shows an explanation diagram of the screen display operation shown in FIG. 7.
Figure 9:
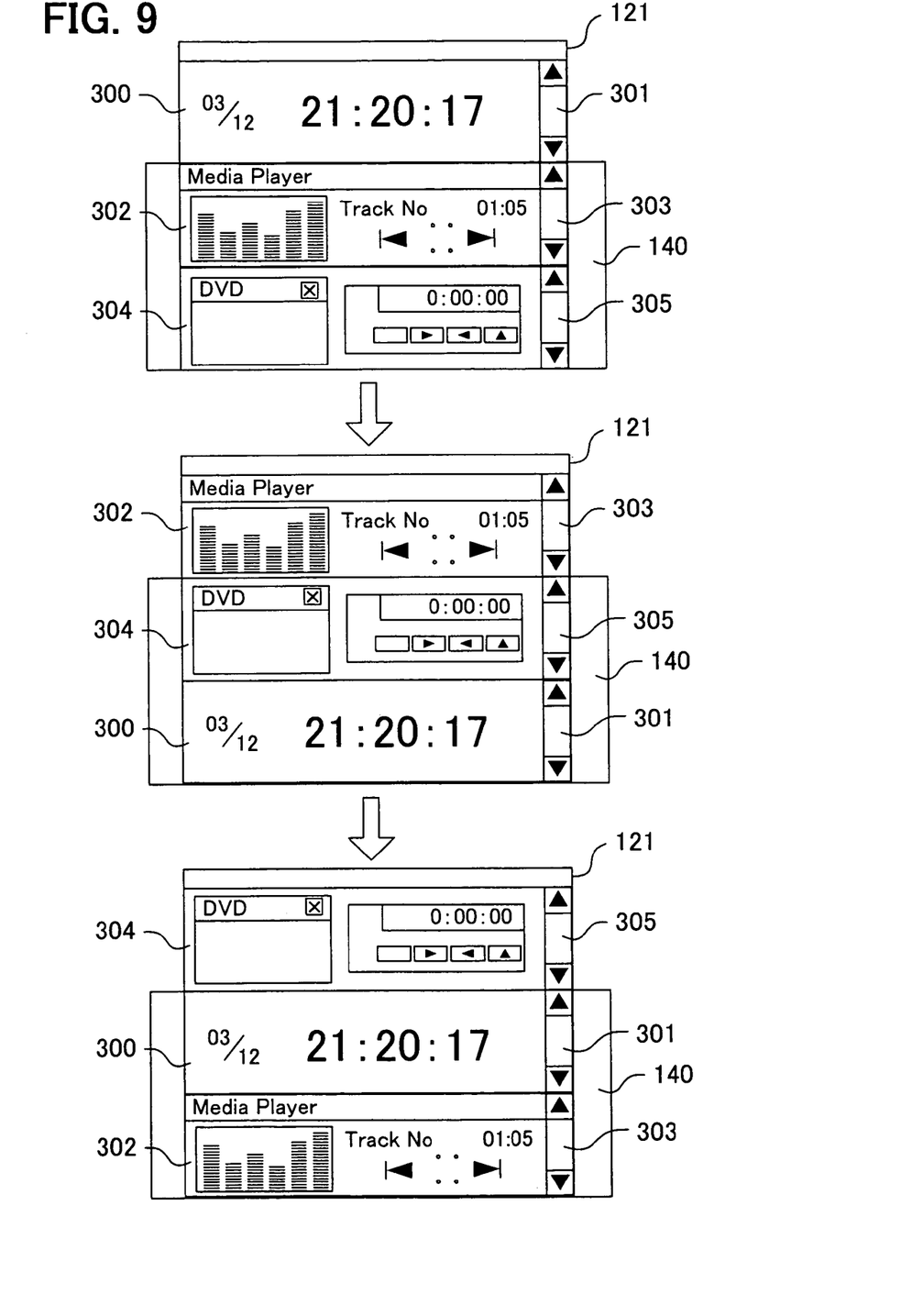
FIG. 9 shows an explanation diagram of a screen display example shown in FIG. 7.

FIG. 6 shows a program configuration diagram executed by CPU 201, FIG. 7 shows a processing flowchart of a resident application program shown in FIG. 6, FIG. 8 shows an explanation diagram of the operation shown in FIG. 7, and FIGS. 9 and 10 show explanation diagrams of exemplary screen display by FIG. 7.

As shown in FIG. 6, the OS (operating system) of CPU 201 is provided with a kernel 300 for controlling hardware 400, application program 320 and necessary user programs 340.

The kernel 300 is a core portion of the OS, and includes a process control program 301 for managing processing processes, a synchronization and communication control program 302 for performing synchronization and communication control, a file system 303 for performing file management, a memory management program 304 for performing memory management, a CPU scheduler 305 for performing schedule management of the CPU, an interruption control program 306 for performing interruption control, an input/output control program 307 for performing input/output control, a timer management program 308 for performing timer management, device drivers 310 for driving devices, and a display driver 312 for driving the display.

Further, according to the present invention, there is provided a resident application 330, which will be illustrated in FIG. 7, for performing screen control in cooperation with the switch provided in hinge 130, via display driver 312.

FIG. 7 shows a process flowchart of the screen control application program cooperated with the switches.

(S10) CPU 201 decides whether or not the keyboard 140 is accommodated. Namely, in order to decide whether the keyboard accommodation state shown in FIG. 2 exists, CPU 201 decides whether the keyboard detection switch 151, shown in FIGS. 4 and 5, detects the keyboard 140 (ON state), and whether the hinge unit open/close detection switch 133 detects a close state of the hinge unit 130 (ON state).

(S12) When both switches 151, 133 are in ON states, CPU 201 decides that the keyboard 140 is in the accommodation state shown in FIG. 2, and shifts to a half display mode. For example, in the case that one-third of the display screen of the above display unit 121 is exposed, three application programs can be screen displayed, as shown in FIG. 8. Here, by dividing the screen, a clock display, a TV display and a DVD display are executed. For this purpose, as shown in FIG. 8, when three programs are activated, or, when a clock display program is automatically initiated in response to ON of the switches 151, 133, and also other application programs (TV, DVD) are initiated, one screen area of VRAM 207 is divided into three, and image data (clock, TV and DVD) of the respective application programs are stored into the graphic controller 206 via the display driver 312, as shown in FIG. 8. With this, as shown in FIG. 8, the three, i.e. clock, TV and DVD, are displayed on the screen of display 121 successively in the vertical direction. At this time, since the lower two-thirds of the screen of the display unit 121 are covered with the keyboard 140, only the clock on the upper one-third is viewable. As shown in FIG. 9, on the above divided screens, scroll bars 301, 303 and 305 are also displayed beside content displays 300, 302 and 304, respectively.

(S14) CPU 201 decides whether a screen rewrite processing request has been made through the operation of the scroll bar 301 by means of the pointer operation of the mouse 150.

(S16) On receipt of the screen rewrite processing request, CPU 201 decides the instruction of either an upward direction or a downward direction of the scroll bar 301. In case of the upward instruction (namely, clicking the upward arrow in scroll bar 301), CPU 201 issues an instruction for modifying a screen display start address upward by one-third of the screen to the graphic controller 206 via the display driver 312. As a result, because VRAM 207 is cyclically used, the screen display start address in VRAM 207 becomes the top of the DVD area, and accordingly, the displays in the vertical direction in the order of DVD, clock and TV are made on the screen of the display 121, as shown by a state 'b' in FIG. 8. At this time, because the lower two-thirds of the screen of display unit 121 are covered with the keyboard 140, the only upper one-third, DVD, is viewable. In FIG. 9, since the display applications are exemplified by clock 300, CD player 302 and DVD 304, the content of the exposed screen area of the upper one-third of the display unit 121 is switched from the clock to the DVD player. Then, the rewrite is completed, and a return to the top is made.

(S18) Meanwhile, in case of the downward instruction (namely, clicking the downward arrow in scroll bar 301), CPU 201 issues an instruction for modifying the screen display start address by one-third of the screen to the graphic controller 206, via the display driver 312. As a result, because the screen display start address in VRAM 207 becomes the top of the TV area, and accordingly, the displays in the vertical direction in the order of TV, DVD and clock are made on the screen of display unit 121, as shown by a state 'c' in FIG. 8. At this time, because the lower two-thirds of the screen of the display unit 121 are covered with the keyboard 140, the only upper one-third, TV, is viewable. In FIG. 9, since the display applications are exemplified by clock 300, CD player 302 and DVD 304, the content of the exposed screen area of the upper one-third of the display unit 121 is switched from the clock to the CD player. Then, the rewrite is completed, and a return to the top is made.

As such, when the keyboard is accommodated in the display unit, the screen is divided, the screens of a plurality of applications are displayed, and the screen display on the exposed screen is switched by scrolling. Thus, the screen display on the exposed screen can be switched at high speed. Also, since only modification of the display start address in the VRAM is necessary, the screen display on the exposed screen can be switched at higher speed, and with simple processing.

Other Embodiments

In the above, the present invention has been described according to the embodiments. However, a variety of modifications may be possible within the scope of the present invention. The foregoing description of the embodiments is not intended to exclude such the modification from the technical scope of the present invention.

For example, as personal computer, the description has been made using a desktop personal computer for use on the desk or a notebook personal computer. However, the present invention is also applicable to other portable electronic apparatuses such as PDA. Also, although the description has been made using an apparatus capable of detaching a keyboard from a display, the present invention is also applicable to an apparatus which is not detachable. Further, although the half display mode has been explained using a three-division screen, it may also be possible to form a plurality of divided screens including two-division, four-division, etc. Similarly, although the first enclosure has been explained as keyboard, the present invention is also applicable to other input devices such as a coordinate input device.

According to the present invention, when a first enclosure such as a keyboard is accommodated in a display, the screen is divided so as to display screens of a plurality of applications, and the screen display on the exposed screen is switched by scrolling. Accordingly, it becomes possible to switch over the screen display on the exposed screen at high speed. Moreover, since only the modification of the screen size is necessary, it becomes possible to switch over the screen display onto the exposed screen at higher speed, and with simple processing.

What is claimed is:

1. A screen display method of an information processing device constituted of a first enclosure and a second enclosure having a display unit, comprising:
    a step of detecting that the first enclosure has been positioned in the second enclosure so as to hide a portion of the screen of the display unit;
    a step of dividing the display area of the display unit into a plurality of screens, and displaying each image of a plurality of application programs on each divided screen in response to the detection; and
    a step of scroll displaying the application program image of the divided screen hidden by the first enclosure, in a screen area of the display unit not hidden by the first enclosure in response to a screen switchover instruction.

2. The screen display method of the information processing device according to claim 1,
    wherein the step of displaying on each divided screen comprises:
    a step of dividing a storage area of a video memory for storing the image of the display area of the display unit into image storage areas for the plurality of application programs; and
    a step of storing the application program image corresponding to each divided storage area,
    and wherein the step of scroll displaying comprises a step of modifying a screen display start address of the video memory, in response to the screen switchover instruction.

3. The screen display method of the information processing device according to claim 1,
    wherein the step of displaying on each divided screen comprises a step of displaying an image including a scroll bar, at least in the image displayed on a screen area of the display unit not hidden by the first enclosure.

4. The screen display method of the information processing device according to claim 1,
    wherein the scroll display step comprises a step of operating a pointer at a scroll bar by means of a mouse.

5. The screen display method of the information processing device according to claim 1,
    wherein the step of displaying on each divided screen comprises a step of dividing the display area of the display unit into a plurality of screens, on a basis that the area not hidden by the first enclosure is treated as one division unit.

6. The screen display method of the information processing device according to claim 1,
    wherein the detection step comprises a step of detecting from an output of detection means for detecting that the first enclosure being attached via a hinge has been accommodated in the second enclosure so as to hide the display unit in the second enclosure.

7. The screen display method of the information processing device according to claim 6,
    wherein the detection step comprises a step of detecting from an output of first detection means for detecting that the first enclosure has been attached to the hinge, and an output of second detection means for detecting that the hinge has been rotated and moved to the display unit in the second enclosure.

8. The screen display method of the information processing device according to claim 1,
    wherein the detection step comprises a step of detecting that a keyboard constituting the first enclosure has been positioned in the second enclosure so as to hide the portion of the display screen.

9. An information processing device comprising:
a first enclosure;
a second enclosure including a display unit and an information processor unit; and
a hinge for accommodating the first enclosure in the second enclosure so that the first enclosure hides a portion of the display screen of the display unit,
wherein, on detection of the first enclosure having been accommodated, the information processor unit divides the display area of the display unit into a plurality of screens, displays each image of a plurality of application programs on each divided screen, and in response to a screen switchover instruction, scroll displays the application program image of the divided screen hidden by the first enclosure, in a screen area of the display unit not hidden by the first enclosure.

10. The information processing device according to claim 9,
wherein the information processor unit includes a video memory for storing the image of the display area of the display unit,
and wherein the information processor unit divides the video memory into a plurality of image storage areas for the plurality of application programs, stores the application program image corresponding to each divided storage area, and modifies a screen display start address of the video memory, in response to the screen switchover instruction.

11. The information processing device according to claim 9,
wherein the information processor unit displays an image including a scroll bar, at least in the image displayed on a screen area of the display unit not hidden by the first enclosure.

12. The information processing device according to claim 9, further comprising:
a mouse for instructing a switchover of the screen, according to an operation of a pointer at the scroll bar.

13. The information processing device according to claim 9,
wherein the information processor unit divides the display area of the display unit into a plurality of screens, on a basis that the area not hidden by the first enclosure is treated as one division unit.

14. The information processing device according to claim 9, further comprising:
detection means for detecting that the first enclosure being attached via the hinge has been accommodated in the second enclosure so as to hide the display unit in the second enclosure.

15. The information processing device according to claim 14,
wherein the detection means comprises:
first detection means for detecting that the first enclosure has been attached to the hinge; and
second detection means for detecting that the hinge has been rotated and moved to the display unit in the second enclosure.

16. The information processing device according to claim 9,
wherein the first enclosure is constituted of a keyboard.

17. A computer readable storage medium stored a program for displaying on a screen of an information processing device including a first enclosure and a second enclosure having a display unit and an information processor unit, causing the information processor unit to execute:
a step of detecting that the first enclosure has been positioned in the second enclosure so as to hide a portion of the screen of the display unit;
a step of dividing a display area of the display unit into a plurality of screens, and displaying each image of a plurality of application programs on each divided screen in response to the detection; and
a step of scroll displaying the image of the divided screen hidden by the first enclosure, in a screen area of the display unit not hidden by the first enclosure in response to a screen switchover instruction.

18. The computer readable storage medium stored a program according to claim 17,
wherein the step of displaying on each divided screen comprises:
a step of dividing a video memory for storing the image of the display area of the display unit into image storage areas for the plurality of application programs; and
a step of storing the application program image corresponding to each divided storage area,
and wherein the step of scroll displaying comprises a step of modifying a screen display start address of the video memory, in response to the screen switchover instruction.

19. The computer readable storage medium stored a program according to claim 17,
wherein the step of displaying on each divided screen comprises a step of displaying an image including a scroll bar, at least in the image displayed on a screen area of the display unit not hidden by the first enclosure.

20. The computer readable storage medium stored a program according to claim 17,
wherein the scroll display step comprises a step of operating a pointer at the scroll bar by means of a mouse.

21. The computer readable storage medium stored a program according to claim 17,
wherein the step of displaying on each divided screen comprises a step of dividing the display area of the display into a plurality of screens, on a basis that the area not hidden by the first enclosure is treated as one division unit.

22. The computer readable storage medium stored a program according to claim 17,
wherein the detection step comprises a step of detecting from an output of detection means for detecting that the first enclosure being attached via a hinge has been accommodated in the second enclosure so as to hide the display unit in the second enclosure.

23. The computer readable storage medium stored a program according to claim 22,
wherein the detection step comprises a step of detecting from an output of first detection means for detecting that the first enclosure has been attached to the hinge, and an output of second detection means for detecting that the hinge has been rotated and moved to the display unit in the second enclosure.

24. The computer readable storage medium stored a program according to claim 17,
wherein the detection step comprises a step of detecting that a keyboard constituting the first enclosure has been positioned in the second enclosure so as to hide the portion of the display screen.

* * * * *